(12) United States Patent
Sweeney et al.

(10) Patent No.: US 8,358,336 B2
(45) Date of Patent: Jan. 22, 2013

(54) FRONTAL HAND CAPTURE OF FINGERPRINTS, PALM PRINTS AND HAND GEOMETRY USING CONTACTLESS PHOTOGRAPHY

(75) Inventors: Latanya A. Sweeney, Pittsburgh, PA (US); Ralph Gross, Pittsburgh, PA (US); Xiaoqian Jiang, Pittsburgh, PA (US)

(73) Assignee: Handshot, LLC, Pittsburgh, PA (US)

( * ) Notice: Subject to any disclaimer, the term of this patent is extended or adjusted under 35 U.S.C. 154(b) by 743 days.

(21) Appl. No.: 12/509,926

(22) Filed: Jul. 27, 2009

(65) Prior Publication Data
US 2010/0165090 A1    Jul. 1, 2010

Related U.S. Application Data

(60) Provisional application No. 61/135,999, filed on Jul. 25, 2008.

(51) Int. Cl.
*H04N 7/18* (2006.01)
(52) U.S. Cl. .......................................................... 348/77
(58) Field of Classification Search ..................... 348/77
See application file for complete search history.

(56) References Cited

U.S. PATENT DOCUMENTS

| | | | | |
|---|---|---|---|---|
| 7,616,784 B2 * | 11/2009 | Kocher | | 382/115 |
| 7,898,385 B2 * | 3/2011 | Kocher | | 340/5.52 |
| 2004/0017934 A1 * | 1/2004 | Kocher | | 382/125 |
| 2008/0056539 A1 * | 3/2008 | Sweeney et al. | | 382/115 |
| 2008/0175517 A1 * | 7/2008 | Andres del Valle | | 382/293 |
| 2009/0116749 A1 * | 5/2009 | Cristinacce et al. | | 382/195 |
| 2009/0245591 A1 * | 10/2009 | Rowe et al. | | 382/115 |
| 2010/0284578 A1 * | 11/2010 | Hillhouse | | 382/124 |
| 2010/0321481 A1 * | 12/2010 | Morin et al. | | 348/77 |
| 2012/0057762 A1 * | 3/2012 | Rowe et al. | | 382/115 |

OTHER PUBLICATIONS

Gross et al., "Generic vs. Specific Active Appearance Models", Image and Vision Computing, 2005, pp. 1080-1093, vol. 23.
Cootes et al., "Active Appearance Models", IEEE Transactions on Pattern Analysis and Machine Intelligence, 2001, pp. 681-685, vol. 23(6).
Matthews et al., "Active Appearance Models Revisited", International Journal of Computer Vision, 2004, pp. 135-164, vol. 60(2).
Gross et al., "Robust Hand Geometry Measurements for Person Identification using Active Appearance Models", IEEE Conference on Biometrics, 2007, Washington DC.

* cited by examiner

*Primary Examiner* — Firmin Backer
*Assistant Examiner* — Jonathan Bui
(74) *Attorney, Agent, or Firm* — The Webb Law Firm, P.C.

(57) ABSTRACT

The present invention is a system and method that captures hand geometry, full-length fingerprints, and/or palm prints from a frontal view of a freely posed hand using contactless photography. A system and method for capturing biometric data of a hand includes the steps of and means for (a) digitally photographing a designated contactless capture area not having any predefined hand-positioning structures or platen for receiving a hand, to obtain a captured image of the capture area that includes a naturally-posed hand; (b) extracting a frontal hand image of the naturally-posed hand by applying an Active Appearance Model (AAM) to the captured image; (c) computing a plurality of hand geometry measurements of the frontal hand image; and (d) comparing the plurality of hand geometry measurements from the frontal hand image to corresponding existing hand geometry measurements, wherein the comparison results in a best match.

1 Claim, 6 Drawing Sheets

| | M2 | M3 | M4 | M5 | M6 | M7 | M8 | M9 | M10 | M11 | M12 | M13 | M14 | M15 |
|---|---|---|---|---|---|---|---|---|---|---|---|---|---|---|
| AvgMean | 434.1935 | 645.9435 | 728.7413 | 643.9215 | 536.8944 | 620.0989 | 933.5206 | 817.7293 | 758.3496 | 850.1235 | 1102.598 | 1033.476 | 908.2513 | 957.7213 |
| AvgStdev | 14.1436 | 10.13595 | 8.843408 | 7.926835 | 8.058131 | 9.953717 | 14.65154 | 8.797033 | 16.53992 | 6.910976 | 11.7292 | 12.89964 | 12.96122 | 9.296884 |
| rms | 30.69893 | 63.72795 | 82.40503 | 81.23311 | 66.62767 | 62.29822 | 63.71483 | 92.95512 | 45.84966 | | 94.00454 | 80.11671 | 70.07451 | |

FIG. 4

3 Folder Cross Validation

| Number of Measures | 1 | 2 | 3 | 4 | 5 | 6 |
|---|---|---|---|---|---|---|
| Best Measure Set | 2 | 2,5 | 4,5,6 | 1,2,4,5 | 1,2,4,5,6 | 1,2,3,4,5,6 |
| Top1 Match Accuracy | 44.44% | 72.22% | 85.19% | 92.59% | 92.59% | 87.04% |
| Standard Deviation | 5.56% | 11.11% | 6.42% | 3.21% | 3.21% | 13.98% |
| Top2 Match Accuracy | 59.26% | 85.19% | 96.30% | 94.44% | 94.44% | 94.44% |
| Standard Deviation | 11.57% | 11.57% | 6.42% | 5.56% | 5.56% | 9.62% |

FRONTAL HAND CAPTURE OF FINGERPRINTS, PALM PRINTS AND HAND GEOMETRY USING CONTACTLESS PHOTOGRAPHY

CROSS REFERENCE TO RELATED APPLICATIONS

This application claims the benefit of U.S. Provisional Patent Application No. 61/135,999 filed Jul. 25, 2008, and entitled "Frontal Hand Capture of Fingerprints, Palm Prints and Hand Geometry Using Contactless Photography," the contents of which are incorporated herein by reference.

BACKGROUND OF THE INVENTION

1. Field of the Invention

The present invention relates to 3-D imaging identification and, more particularly, to a system and method for identifying an individual based on hand geometry and/or fingerprints and palm prints.

2. Description of Related Art

Generally, the more information which can be extracted from a hand, the more effective and useful the prints obtained will be for background checks, forensic investigations, security, etc. Also, fingerprint and palm print technology is becoming particularly necessary in airports and border patrols to prevent terrorism and other criminal activity. In all of these contexts, the prints captured are often compared with those in large databases. Thus, there is an escalating need for fast, accurate and complete fingerprint and palm print capturing to serve these purposes. However, the presently available touchless technology inefficiently requires fingerprints to be captured one at a time, and fails to capture the majority of the biometric information on the hand as a whole. Furthermore, the prior art capture devices introduce operator error or incorrect data capture. For example, because only one finger is scanned at a time, it may be the case that the wrong finger is inserted for scanning purposes, either unintentionally or deliberately. Therefore, the resultant captured fingerprint data may be incorrect with respect to the intended digital representation of a particular finger. Additionally, the prior art captures only the front and sides of the distal ends of the fingers and thumb. Information contained on the more proximal surfaces of the fingers, the tips of the fingers, and the palm is not captured by the prior art devices. The prior art devices are also limited due to speed, capture area, physical size, and rigid placement of hands.

Almost any characteristic of a person can be used as a biometric identifier, including the shape of a person's hand. Commercially available systems utilizing hand geometry require strict placement of hands against an outlined platen, a fixed arrangement of pegs, or other predefined hand positioning structure. For example, the HandKey II system by Recognition Systems requires a subject to place his or her hand on a lit table within rigid pegs. One camera images the back of the hand and another camera images the sides of the finger. The prior art system takes about 50-100 measurements using finger length, thickness, curvature, etc. A shortcoming of the prior art system is its requirement through usage of pegs to provide uniform placement of the hand. The system may fail to recognize the same hand unless the subject places fingers in the specific rigid formation outlined by the pegs. The system may also fail to recognize the same hand if the subject varies the amount of pressure that individual fingers exert against the pegs. Varying pressures applied by the same subject against the pegs often leads to radically different measurements and recognition errors.

There is a tenet in biometrics that more is better, meaning, that the more biometric information obtained from a person, the more unique the combination of observations will be and, therefore, there is more confidence in establishing the person's unique identity. Therefore, obtaining as much biometric hand data as possible is very useful for identification, recognition and authentication and, as such, there is a continual need for systems and methods which can capture and process all such information accurately and efficiently.

SUMMARY OF THE INVENTION

The present invention computes hand geometry measurements, which are available as an additional biometric on subjects, and can be used in conjunction with prints for improved identification, or alone, as a complete hand geometry system. Hand geometry systems are useful for lower security applications. Using hand geometry systems, when applicable, minimizes the number of fingerprint collections, because only hand geometry measurements are stored. The present invention innovates hand geometry by providing a robust and fast capture implementation with few measurements that need to be taken. This is in contrast to a traditional hand geometry system that is physically bulky, requires rigid placement of hands against pegs, and takes more than a hundred measurements. In comparison, the present invention hand geometry system fits a mesh to a hand in real-time, giving exact locations of hand and finger parts.

In one embodiment, the present invention includes a device and software that provides fingerprints, finger flat prints, palm print, and/or hand geometry measures using contactless photographic capture of a freely posed open hand in a structured, semi-structured, or unstructured environment. Processes of this embodiment may involve some combination of: (1) locating the hand in the image; (2) segmenting the hand from the background; (3) computing useful hand geometry measures; and (4) producing ink-like prints from the photograph sufficient for comparison to fingerprints stored in law-enforcement databases.

Generally, the present invention includes a method for capturing biometric data of a hand including the steps of (a) digitally photographing a designated contactless capture area not having any predefined hand-positioning structures or platen for receiving a hand, to obtain a captured image of the capture area that includes a naturally-posed hand; (b) extracting a frontal hand image of the naturally-posed hand by applying an Active Appearance Model (AAM) to the captured image; and (c) computing a plurality of hand geometry measurements of the frontal hand image. The method may further include the step of illuminating the capture area. The method may also include the step of applying background subtraction to the captured image.

The AAM in the context of the present invention is established by (a) identifying a respective plurality of anchor points on a plurality of existing images of hands; (b) calculating a set of vertices from the plurality of existing images of hands using the respective plurality of anchor points; and (c) fitting the set of vertices on the hand of the captured image.

The step of computing the plurality of hand geometry measurements includes the steps of (a) for each of the plurality of hand geometry measurements, identifying a first and second anchor point from a plurality of anchor points forming vertices on the hand of the captured image from the AAM and (b) determining the linear distance between the first anchor point and the second anchor point. The linear distance may be expressed in pixels, metric units, or imperial units, or any other suitable unit.

In one embodiment, the plurality of hand geometry measurements includes (a) the length of the index finger of the hand; (b) the length of the middle finger of the hand; (c) the distance across the top of the palm from the index finger to the little finger of the hand; (d) the distance across the middle of the palm; and (e) the distance between a point at the base of the thumb to a point at the base of the hand.

The present invention may also include the step of comparing the plurality of hand geometry measurements from the frontal hand image to corresponding existing hand geometry measurements, wherein the comparison results in a best match. One type of comparison may include performing a principal component analysis. In one embodiment, the comparison includes (a) creating a vector containing the plurality of hand geometry measurements and (b) comparing the vector against other vectors containing at least the plurality of hand geometry measurements to identify at least one of the other vectors that minimizes the Euclidean distance $$d(x, Yi) = \sqrt{((x\_1 - Yi\_1)^2 + (x\_2 - Yi\_2)^2 + (x\_3 - Yi\_3)^2 + \ldots (x\_x_n - Yi\_n)^2)}$$

wherein the identified at least one vector is the best match.

The present invention may also include the steps of (a) capturing at least one fingerprint image of the naturally-posed hand; (b) deriving an inked version equivalent of the at least one fingerprint image; and (c) comparing the inked version equivalent to a plurality of existing inked version equivalents. The step of deriving an inked version equivalent may include the steps of (a) applying a re-shading algorithm to the fingerprint image to remove unwanted illumination effects; (b) applying an auto-varying threshold algorithm to convert the fingerprint image into a black and white image and to remove illumination artifacts; and (c) applying an edge clean-up and inversion algorithm to invert the black and white image and model ink edge effects A system for implementing the aforementioned method may include (a) a camera for digitally photographing a designated contactless capture area not having any predefined hand-positioning structures or platen for receiving a hand, to obtain a captured image of the capture area that includes a naturally-posed hand; (b) a storage medium connected to the camera for storing the captured image; (c) a processor connected to the camera and the storage medium; (d) a light for illuminating the capture area; (e) a storage medium for storing at least a frontal hand image; and (f) a display connected to the processor, wherein the display is configured to display at least the frontal hand image.

The processor may be configured to (a) extract a frontal hand image of the naturally-posed hand by applying an Active Appearance Model (AAM) to the captured image; (b) apply background subtraction to the captured image; and (c) compute a plurality of hand geometry measurements of the frontal hand image. The processor may be configured to compare the plurality of hand geometry measurements from the frontal hand image to corresponding existing hand geometry measurements, wherein the comparison results in a best match. The comparison may include the method outlined, above.

The contactless frontal hand capture of the present invention offers various novel characteristics. First, there are no pegs or glass touched by a hand. This means that there is no need for cleaning due to smudges, there is improved hygiene, and there is a lack of distortion resulting from applying inconsistent or improper pressure against the glass or pegs. Second, the contactless frontal capture captures more print information than slap capture devices, which are the new standard for use at U.S. borders. Slap capture devices image the flats of fingers when they are pressed against a glass platen. The present invention captures more print information from the fingers, and includes the palm and base of the fingers freely posed in the air. This additional print information is critical for law enforcement because latent prints left at crime scenes often result from grabbing or gripping objects. The ability to match prints from the base of the fingers and palms improves law enforcement efforts. Third, the present invention is faster than a prior art slap capture device in terms of image capturing, as the present invention utilizes photography, as opposed to scanning. Fourth, the present invention includes hand geometry, which allows hand geometry to be stored along with prints. Fifth, the present invention may also provide for the simultaneous capture of other biometrics, such as the face, ear, and/or iris. Sixth, the present invention may be lightweight and extremely portable, thereby enabling new uses for prints and/or hand geometry. Because the software of the present invention may also work with freestanding cameras, including those embedded in laptop computers or mobile phones, it is envisioned that the present invention may be implemented outside of law enforcement context. Non-limiting examples include secure transactions over the web, palm reading, contactless login/authentication on machines, and contactless access in messy and/or critical environments like hospitals, airports, or fast responder situations.

With respect to a law enforcement implementation, as described above, capturing prints from the full frontal hand (including flats and palms) increases possible matches with partial latent prints left at crime scenes because more print area is available for comparison. Booking stations currently have physically large systems capable of capturing all ten prints (including the sides of the fingers), finger flats, and palms. These systems require trained professionals, who roll each finger of each subject separately on a glass platen, and then proceed to press the finger flats and finally the palms. The process takes about 20-45 minutes per person. In comparison, the present invention is contactless and produces all frontal prints in a significantly shorter time (e.g., five seconds).

Still other desirable features of the invention will become apparent to those of ordinary skill in the art upon reading and understanding the following detailed description, taken with the accompanying drawings.

DETAILED DESCRIPTION OF THE INVENTION

It is to be understood that the specific system illustrated in the attached figures and described in the following specification is simply an exemplary embodiment of the present invention. Hence, specific dimensions and other physical characteristics related to the embodiments disclosed herein are not to be considered as limiting.

U.S. patent application Ser. No. 11/515,228 filed Sep. 1, 2006 entitled "Method and System for Capturing Fingerprints, Palm Prints and Hand Geometry", published as U.S. Patent Application Publication No. 2008/0056539, incorporated herein by reference in its entirety, discloses a system and method for touchlessly obtaining fingerprints and palm prints using a plurality of cameras and lights to quickly and efficiently capture all such biometric information. Specifically, the system includes a device for capturing biometric data of a hand, which includes an enclosure having an opening adapted to receive a hand in a first orientation and a low resolution camera within the enclosure, wherein the camera is positioned substantially perpendicular to the palm of the hand so as to capture the palm, fingers and thumb of the hand in a single image. The enclosure desirably has an interior surface, which is substantially non-reflective, and may optionally be contoured and configured to engage with a hand to retain the position of the hand in the optimal orientation. The system also includes a plurality of high resolution cameras arranged in a substantially arc-shaped configuration, wherein the high resolution cameras are positioned to capture images corresponding to respective sections of a biometric region of the hand, such that the images captured by said high resolution cameras, when combined, span the biometric region of the hand. The system also includes a plurality of lights within the enclosure positioned to illuminate each respective section of the biometric region from at least three different directions.

Figure 1:
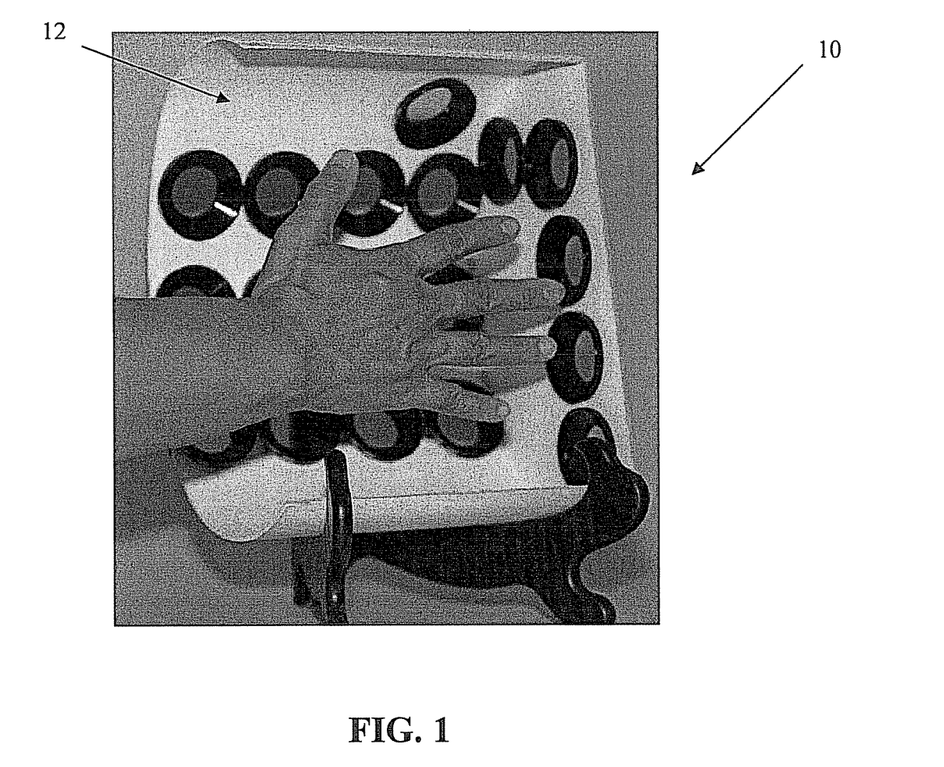
FIG. 1 depicts a perspective view of a contactless 3-D hand imaging system, in accordance with the present invention.
Figure 2:
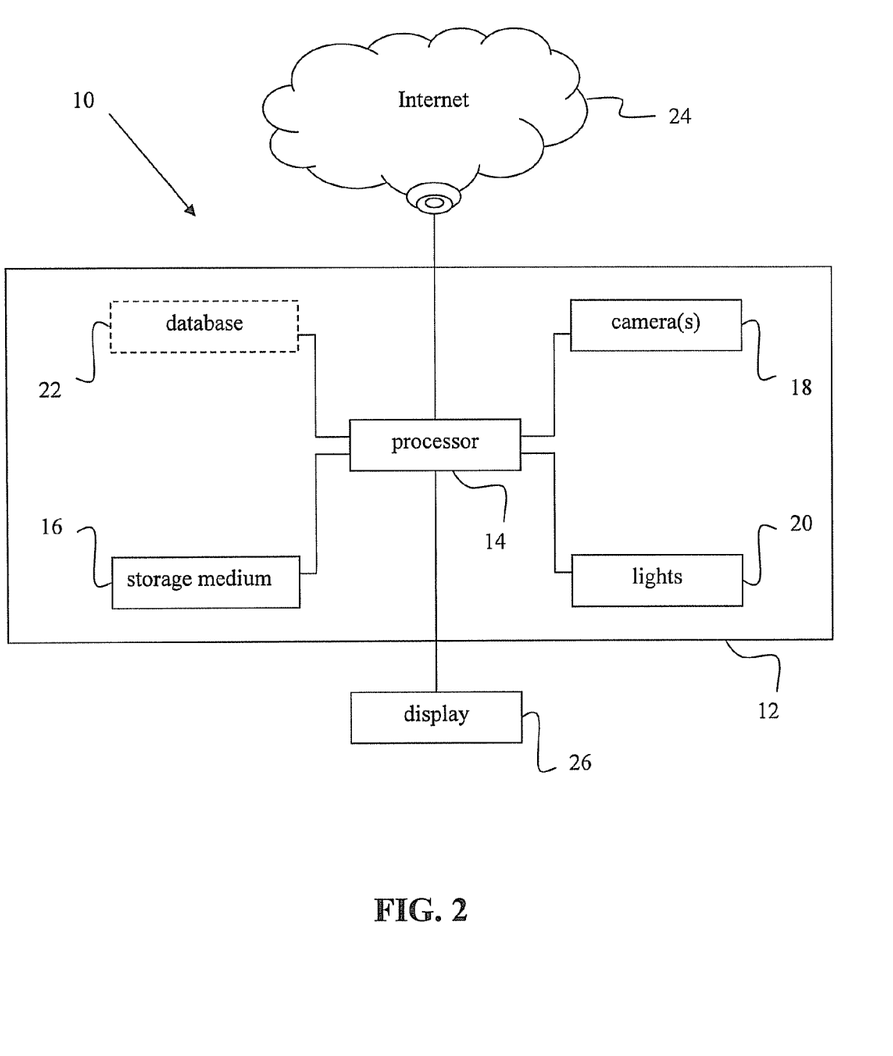
FIG. 2 depicts a schematic view of the system of FIG. 1.

FIG. 1 depicts a contactless 3-D hand imaging system 10 that may include the structure, features, and functionality of the system disclosed in the aforementioned application. FIG. 2 depicts a schematic illustration of the system 10. Generally, the system 10 may include an enclosure 12 containing various electrically and/or communicatively connected components, such as a processor 14, a storage medium 16, one or more cameras 18 with associated lighting 20, and optionally a database 22. The processor 14 is configured to analyze the images obtained from the camera 18 to determine hand geometry measurements, as discussed below. As previously discussed in connection with the device in the aforementioned application, the processor 14 may also be connected to the lights 20 to provide necessary lighting to obtain suitable images for processing. The processor 14 is further configured to perform numerous manipulations of the imaged data received from the camera 18, as discussed below. It is to be understood that the system 10 may include the necessary software for implementing the methods discussed herein. The storage medium 16 may have such software stored therein.

Optionally, the processor 14 may also be connected to the database 22, which contains images that may be cross-referenced with those captured by the system 10 or created as output data by the processor 14. For example, the database 22 may contain frontal capture hand images and/or fingerprint images from the records of law enforcement agencies or authentication entities.

It is to be understood that the database 22 may be a separate and distinct element and external and/or remote from the system 10. The processor 14 may optionally be connected to a distributed communications network, such as the Internet 24. Thus, rather than having the processor 14 be connected to the database 22 of images, the images may instead be downloaded by the processor 14 from other databases via the Internet 24. Also the image data captured by the camera 18, as well as the output data from the processor 14, may be transferred through the Internet 24 or made available for download. Accordingly, cross-referencing and/or comparison of the captured biometric image data with existing biometric image data may be performed at a facility that is geographically remote from a facility in which the system 10 operates. It is to be understood that the remote computer may have the necessary hardware and software operative thereon for supporting the cross-referencing and/or comparison analysis. Thereafter, data representative of the results of the analysis or related processing may be transmitted back to the system 10 via the Internet 24. It is to be understood that the data capture, transmission thereof, and receipt of the comparison analysis may be accomplished in real-time or near real-time (e.g., subject to network communications latency). The image data from the camera 18 and the images in the database 22 or from the Internet 24 may be displayed on either an integrated or externally connected display 26.

The aforementioned system 10 utilizes Active Appearance Models (AAM) to determine the position and orientation of a hand within the enclosure 12 of the system 10. As is known in the art, AAM involves manually labeling fixed or anchor points, or vertices, on many different training images of hands, a model set of vertices is calculated from the training images. A new or unseen hand can then be fit with a similar set of vertices by the AAM while a camera is capturing the image data. This fitting is achieved by virtue of the fact that different people's hands have similar shapes and proportions. Once a new hand is fitted by the AAM, the model can be used to extract arbitrary portions of the hand, such as the fingertips. The shapes, distances and proportions of the parts of the hand can be accurately measured by the AAM to capture the position, orientation and hand geometry of the new hand. A general background on utilizing AAM to obtain hand geometry measurements is disclosed in articles: Gross, R., Li, Y., and Sweeney, L., "Robust Hand Geometry Measurements for Person Identification using Active Appearance Models", IEEE Conference on Biometrics, Washington, D.C., September 2007; Cootes, T., Edwards, G., and Taylor, C. "Active appearance models", IEEE Transactions on Pattern Analysis and Machine Intelligence, 23(6):681-685, June 2001; Matthews, I. and Baker, S. "Active Appearance Models Revisited", International Journal of Computer Vision, 60(2):135-164, 2004; and S. Baker, "Generic vs. Person Specific Active Appearance Models", Image and Vision Computing. 23(12): 1080-1093, 2005, incorporated herein by reference in their entirety.

The present invention may utilize the photographic capture capabilities of the aforementioned system 10 to obtain frontal hand data and other biometric data, however, it is to be understood that other suitable image capture devices may be used. Accordingly, the present invention encompasses the design of any devices and systems that capture hand geometry, full length fingerprints, and/or palm prints from a frontal view of a freely posed hand using contactless photography. The capture environment, which constrains lighting and background, may be structured (i.e., requiring insertion of hands into a device), semi-structured (i.e., hands are not enclosed, but lighting and background are controlled), or unstructured (i.e., using naturally occurring locations with little or no concern to lighting or background). Thus, such systems can additionally be used to simultaneously capture the face, ear, iris, and/or other biometric. As more devices include cameras (e.g., laptops and mobile phones), new uses of fingerprint and hand geometry capture are possible. In comparison to single finger and finger flat devices, the present invention is also configured to simultaneously capture the fingerprints, palm print, and hand geometry, yielding even further identifying information. It is envisioned that future technological advances would allow for hand data to be captured in a variety of contexts, for example, such as from a waving hand without the use of an enclosed imaging environment.

A suitable photographic capturing device, such as the camera 18, may be used to initially obtain hand image data (e.g., frontal view of a naturally-posed hand). Appropriate AAM hardware/software processes allow for a generic model of a hand to be fitted to images taken by the camera 18. This may be done in a silhouette capture context or an illuminated frontal view context in which images are recorded against a known background, using known illumination and other variables, to allow background subtraction to compute the approximate hand location. This position information initializes an iterative model-fitting algorithm, which computes the best-fit model parameters. Convergence of the fitting process may yield more accurate pixel positions of the hand boundary, and resolves artifacts such as shadows. Once fitted, the pixel positions of the mesh allows for reliable extraction of the hand, in accordance with known AAM principles. It is to be understood that the AAM framework may be applied to fit a model to a hand as it enters a designated capture area. Additionally, it is to be understood that either one hand may be imaged or both hands may be imaged simultaneously. Furthermore, it is to be understood that any suitable AAM implementation may be used in connection with the present invention.

Figure 3:
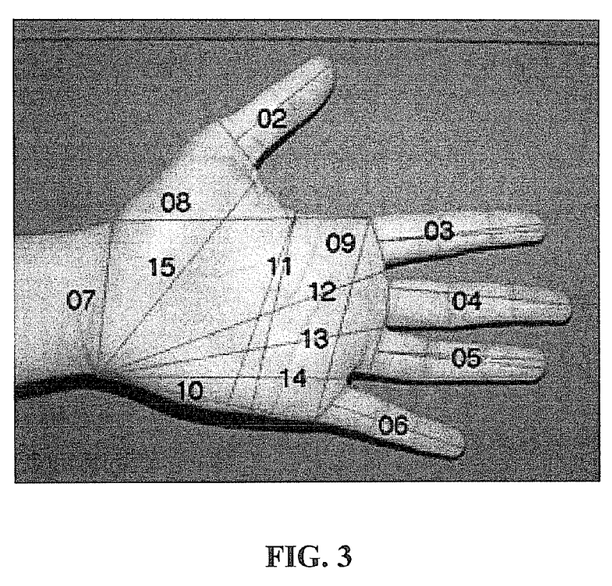
FIG. 3 depicts an imaged hand having a plurality of labeled measurements associated therewith.
Figure 4:
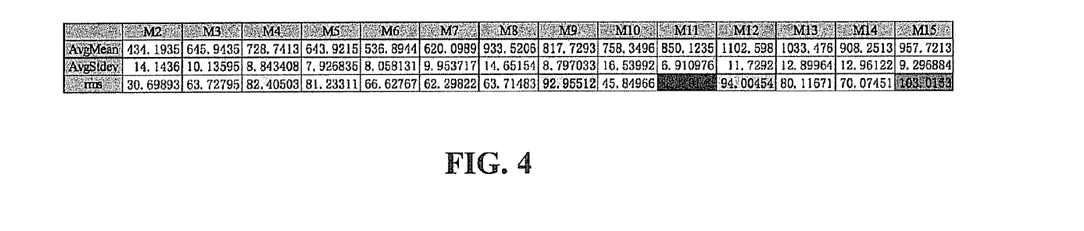
FIG. 4 depicts a table containing the corresponding distance measurement of each labeled measurement of FIG. 3.

After frontal hand images have been extracted, hand measurements are applied thereto. Generally, measurements are computed directly from the AAM fit to the extracted hand image. The measurements may utilize previously identified AAM anchor points. A measurement of the hand includes the length of a line connecting two anchor points. Such a measurement may be the distance across the palm at various points, lengths of each isolated finger, etc. For example, as shown in FIG. 3, 14 measurements are taken, with the fourteen measurements labeled as M2 to M15, respectively. FIG. 4 depicts a table containing the corresponding measurement in pixels (i.e., distance in actual image) of each labeled measurement. Thus, for example, the length of the ring finger, as represented by measurement M5, is 81.23311 pixels, whereas the distance across the wrist, as represented by measurement M7, is 62.29822 pixels. It is to be understood that measurement units other than pixels may be used. For example, if a calibrated camera is consistently used, then actual metric units (e.g., mm) may be used to represent measured distances. The table of FIG. 4 also includes the Average (i.e., mean) and Standard Deviation representative of an analysis of the consistency of measurements across measurements taken of all hand images within the database 22. The consistency is calculated as the mean divided by the standard deviation.

Principal Components Analysis may be used to identify which subject in the database 22 has other images in the database 22 that best match a candidate (i.e., the extracted frontal hand image). In one embodiment of performing a comparison of the obtained hand measurements of a candidate image against those existing in a database 22 for identification purposes, the obtained hand measurements serve as independent dimensions when computing nearest neighbor distances. For example, assuming that a measurement vector $x=(x\_1, x\_2, x\_3)$ is defined using the measurements labeled M4, M5, and M6, an instance for a particular subject may be represented as $x=(728.7413, 643.9215, 536.8944)$. Assuming that a reference database of subject measurements is represented as $S=\{Y1, Y2, \ldots, Yn\}$, the vector x is compared with each vector in S to find the vector that minimizes the Euclidean distance: $d(x, Yi)=SQRT((x\_1-Yi\_1)^2+(x\_2-Yi\_2)^2+(x\_3-Yi\_3)^2)$. The identified vector would correlate to the matching subject in the database 22.

Figure 5:
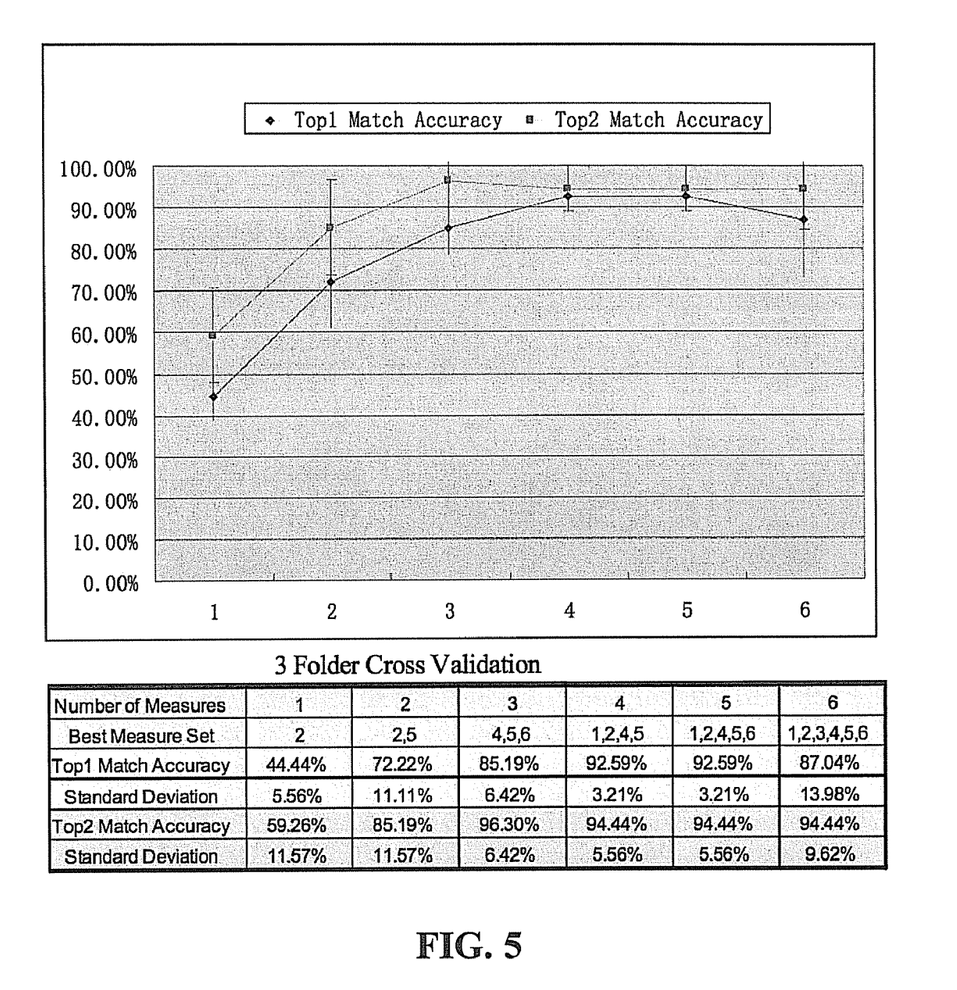
FIG. 5 depicts a graph showing matching rates using the distance measurements taken from FIG. 4.

It is to be understood that instead of using all measurements, an r-combination of features that provide the best results for r=1 to the maximum number of measurements may be used. FIG. 5 depicts graphed matching rates using the measurements taken from FIG. 4. Specifically, the graph of FIG. 5 shows the percentage of times the actual subject was the best match reported (i.e., "top 1 match"). The graph also shows the percentage of times the actual subject was one of the top two matches ("identifiability"). The horizontal axis is the r-combination used. For r=1, the inventors identified that the most consistent measurement was M2 (i.e., across the base of the fingers). The "top 1 match" using only measurement M2 was 44%. For r=3, the most consistent measurements were M4, M5, and M6, providing a "top 1 match" rate of 85%. For r=4, the most consistent measurements were M1, M2, M4, and M5, providing a "top 1 match" rate of 93%. Based on the graphed data, it is apparent that a comparison of a greater number of measurements may not necessarily yield a higher rate of identification of a subject. For example, using four or five measurements gives 93% "top 1 matches", whereas the addition of a sixth measurement reduces the identifiability to 87%. This is due to the fact that an included measurement may be more prone to measurement inconsistencies. For example, changing the angle at which the subject holds his or her little finger can change the value of the corresponding measurement, which makes that measurement less reliable for matching. The inventors have identified, with respect to the test database, that the most optimal identification of a subject involves measurements M3, M4, M9, M11, and M15.

It is to be understood that the accuracy of an identification search of a subject may be improved by analyzing captured fingerprint data along with hand geometry data. Accordingly, based on the camera configuration, the system 10 provides for capturing not only a frontal hand image, but also images of all of the biometric data contained on the palm, fingers and thumb in a single quick capturing sequence.

Figure 6:
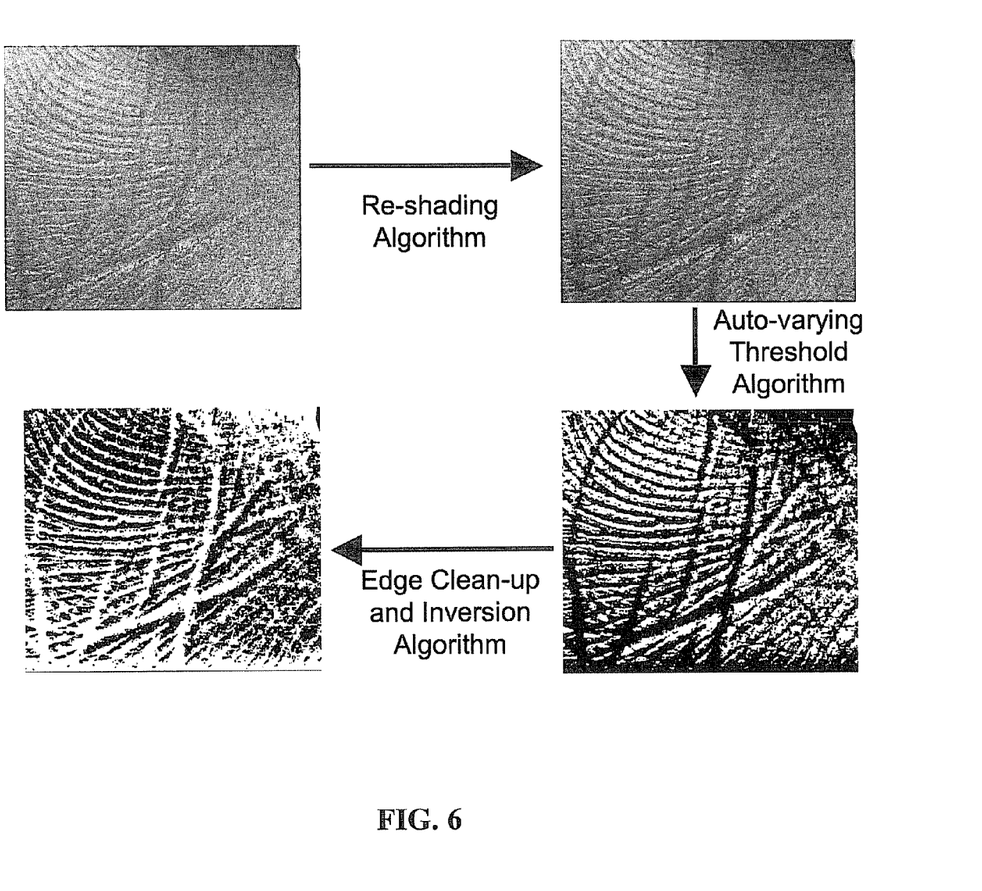
FIG. 6 depicts illustrative steps for producing an inked version equivalent of a photographed fingerprint image.

The system 10 is configured to convert the captured image data to conforming standard formats (e.g., those of law enforcement agencies) for the purposes of matching biometric data with other samples. Thus, the system 10 may produce an inked version equivalent from a photographed fingerprint image, as outlined in FIG. 6. Generally, using the aforementioned AAM model fit principles, a finger to be processed is identified and cropped from the imaged hand. A re-shading algorithm is then applied to remove unwanted illumination effects. Next, an auto-varying threshold algorithm converts the color image to black and white while combating unwanted illumination artifacts. This may include an initial grayscale conversion. Then, an edge clean-up and inversion algorithm inverts the image while modeling ink edge effects. The system 10 may also perform other compilations, optimizations, and manipulations of the raw image data captured by the camera 18. For example, during the aforementioned processes, a pressure distortion algorithm may be applied, which simulates the deformities caused by pressing a finger against a surface (as is the case with traditional fingerprint recordation). The pressure deformation algorithm may operate by accounting for the known elastic properties of the fingers and skin and how the friction ridges on the surface of the skin are affected by such pressures. The width of peaks and valleys of the finger may also be altered to conform to standard formats. Thereafter, the inked version equivalent may then be compared to existing fingerprint records, as is known in the art.

Figure 7:
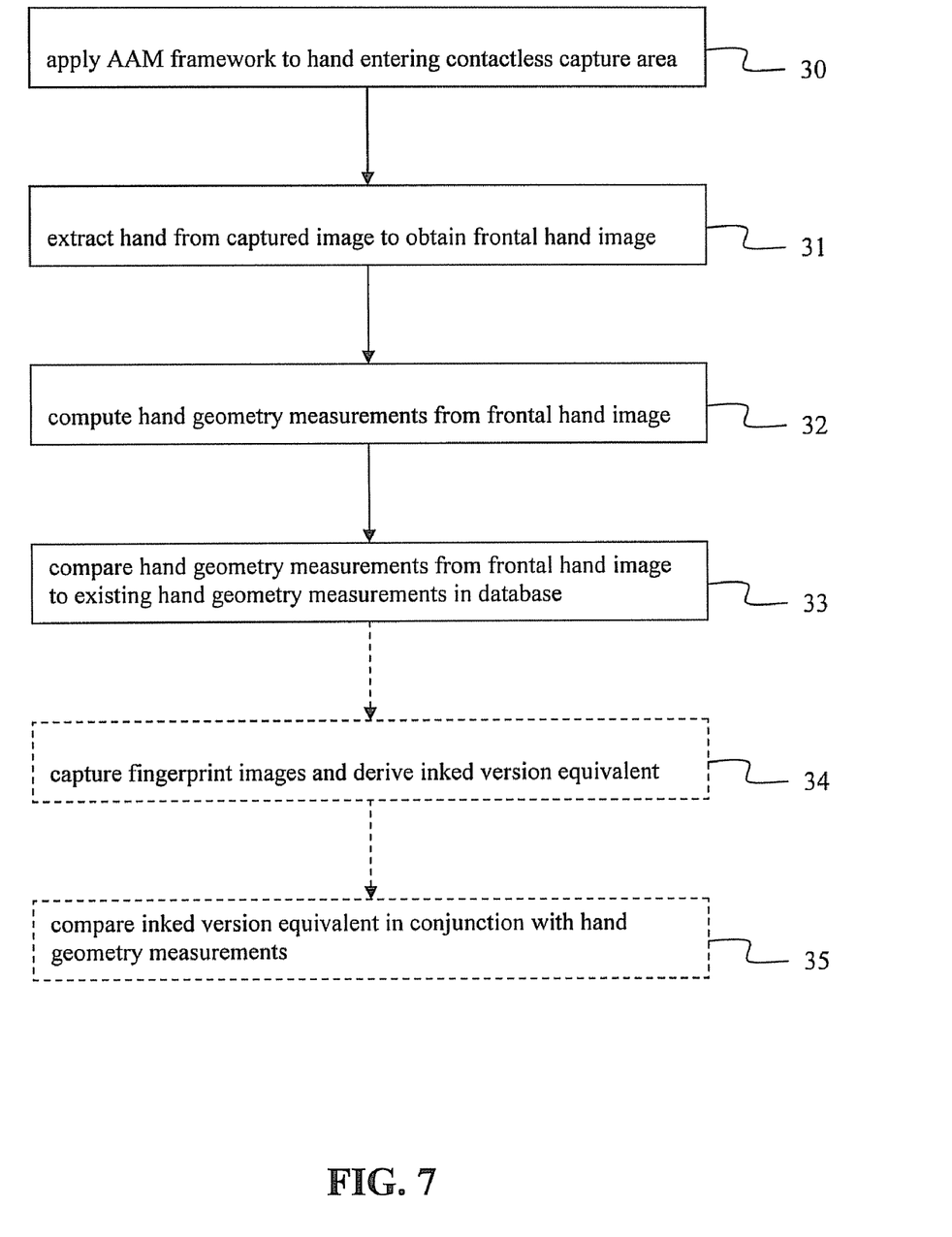
FIG. 7 is a flow chart depicting processing steps of the present invention.

As shown in the flowchart of FIG. 7, in operation, one embodiment of the present invention includes first applying an AAM framework to a hand entering a designated contactless capture area not having any predefined hand-positioning structures, as set forth in step 30. This results in locating the hand in a captured image. Then, in step 31, the hand is extracted from a background of the captured image to obtain an extracted frontal hand image. Next, hand geometry measurements are computed from the extracted frontal hand image, as set forth in step 32. Then in step 33, the computed hand geometry measurements of the extracted frontal hand image are compared against existing hand geometry measurements of a database. This results in identifying a best match candidate. Optionally, the present invention may also capture fingerprint images and derive an inked version equivalent of the photographed fingerprint image, as set forth in step 34. As set forth in step 35, the inked version equivalent may be analyzed in conjunction with the hand geometry measurements.

Notwithstanding the foregoing, the methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may include one or more cores that may enhance speed and performance of a multiprocessor. In embodiments, the process may be a dual core processor, quad core processors, other chip-level multiprocessor and the like that combine two or more independent cores (called a die). The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

The methods and systems described herein may be deployed in part or in whole through a machine that executes computer software on a server, client, firewall, gateway, hub, router, or other such computer and/or networking hardware. The software program may be associated with a server that may include a file server, print server, domain server, interne server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention has been described with reference to various embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A method of capturing biometric data of a hand comprising the steps of:
   digitally photographing a designated contactless capture area, the area not having any predefined hand-positioning structure or platen for receiving a hand to obtain a captured image of the capture area that includes a naturally-posed hand;
   extracting a frontal hand image of the naturally-posed hand by applying an Active Appearance Model (AAM) to the captured image; and
   computing a plurality of hand geometry measurements of the frontal hand image;
   wherein the step of computing hand geometry measurements includes the steps of:
      for each of the plurality of hand geometry measurements, identifying a first and second anchor point from a plurality of anchor points forming vertices on the hand of the captured image from the AAM; and
      determining the linear distance between the first anchor point and the second anchor point;
   further comprising the step of comparing the plurality of hand geometry measurements from the frontal hand image to corresponding existing hand geometry measurements, wherein the comparison results in a best match;
   further comprising the steps of:
      capturing at least one fingerprint image of the naturally-posed hand;
      deriving an inked version equivalent of the at least one fingerprint image; and
      comparing the inked version equivalent to a plurality of existing inked version equivalents;
      wherein the step of deriving an inked version equivalent includes the steps of applying a re-shading algorithm to the fingerprint image to remove unwanted illumination effects, applying an auto-verifying threshold algorithm to convert the fingerprint image into a black and white image and to remove illumination artifacts, and applying an edge clean-up and inversion algorithm to invert the black and white image and model ink edge effects.

* * * * *